United States Patent
Choi et al.

(10) Patent No.: US 10,454,171 B2
(45) Date of Patent: Oct. 22, 2019

(54) ANTENNA COIL APPARATUS AND ELECTRONIC DEVICE HAVING COIL ANTENNA

(71) Applicant: Samsung Electronics Co., Ltd., Gyeonggi-do (KR)

(72) Inventors: Sehwan Choi, Gyeonggi-do (KR); Jungsik Park, Gyeonggi-do (KR); Kwonho Song, Gyeonggi-do (KR); Jaeyoung Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/895,246

(22) Filed: Feb. 13, 2018

(65) Prior Publication Data
US 2018/0233824 A1 Aug. 16, 2018

(51) Int. Cl.
| | |
|---|---|
| H01Q 7/00 | (2006.01) |
| H01Q 1/24 | (2006.01) |
| H01Q 5/378 | (2015.01) |
| H04B 5/00 | (2006.01) |

(52) U.S. Cl.
CPC .............. *H01Q 7/00* (2013.01); *H01Q 1/242* (2013.01); *H01Q 1/243* (2013.01); *H01Q 5/378* (2015.01); *H04B 5/0037* (2013.01); *H04B 5/0081* (2013.01)

(58) Field of Classification Search
CPC .......... H01Q 7/00; H01Q 1/243; H01Q 1/242; H01Q 5/378; H04B 5/0081; H04B 5/0037
USPC ........................................................... 343/867
See application file for complete search history.

(56) References Cited

U.S. PATENT DOCUMENTS

| | | | |
|---|---|---|---|
| 9,607,757 B2* | 3/2017 | Hirobe | H01Q 5/40 |
| 2008/0245851 A1 | 10/2008 | Kowalski | |
| 2011/0243120 A1 | 10/2011 | Ginsburg et al. | |
| 2012/0223149 A1* | 9/2012 | Kato | H01Q 1/2216 235/492 |
| 2012/0228956 A1* | 9/2012 | Kamata | H02J 7/0027 307/104 |
| 2014/0168019 A1 | 6/2014 | Hirobe et al. | |
| 2014/0220889 A1 | 8/2014 | Zhu et al. | |
| 2014/0266939 A1 | 9/2014 | Baringer et al. | |
| 2014/0273841 A1 | 9/2014 | Behin | |
| 2016/0076952 A1* | 3/2016 | Kim | H03K 17/962 345/173 |

(Continued)

FOREIGN PATENT DOCUMENTS

| | | |
|---|---|---|
| CN | 104092020 A | 10/2014 |
| WO | 2007/099592 A1 | 9/2007 |

OTHER PUBLICATIONS

European Search Report dated Jul. 18, 2018.

*Primary Examiner* — Lam T Mai
(74) *Attorney, Agent, or Firm* — Cha & Reiter, LLC

(57) ABSTRACT

An electronic device includes a resonance coil forming at least one loop and configured to resonate at a specific frequency. A feeding coil forms at least one loop, is physically separated from the resonance coil, and is located in proximity to the resonance coil to enable electromagnetic coupling with the resonance coil. A communication circuit is electrically connected to the feeding coil and configured to generate an electric signal of the specific frequency.

17 Claims, 18 Drawing Sheets

(56) References Cited

U.S. PATENT DOCUMENTS

| | | | |
|---|---|---|---|
| 2016/0141882 A1* | 5/2016 | Ichikawa | H02J 7/025 |
| | | | 307/104 |
| 2016/0191122 A1 | 6/2016 | Yang et al. | |
| 2016/0204836 A1 | 7/2016 | Lee et al. | |
| 2016/0327444 A1* | 11/2016 | Ichikawa | G01L 3/108 |
| 2016/0352148 A1* | 12/2016 | Ichikawa | G01L 3/101 |
| 2017/0005399 A1 | 1/2017 | Ito et al. | |

* cited by examiner

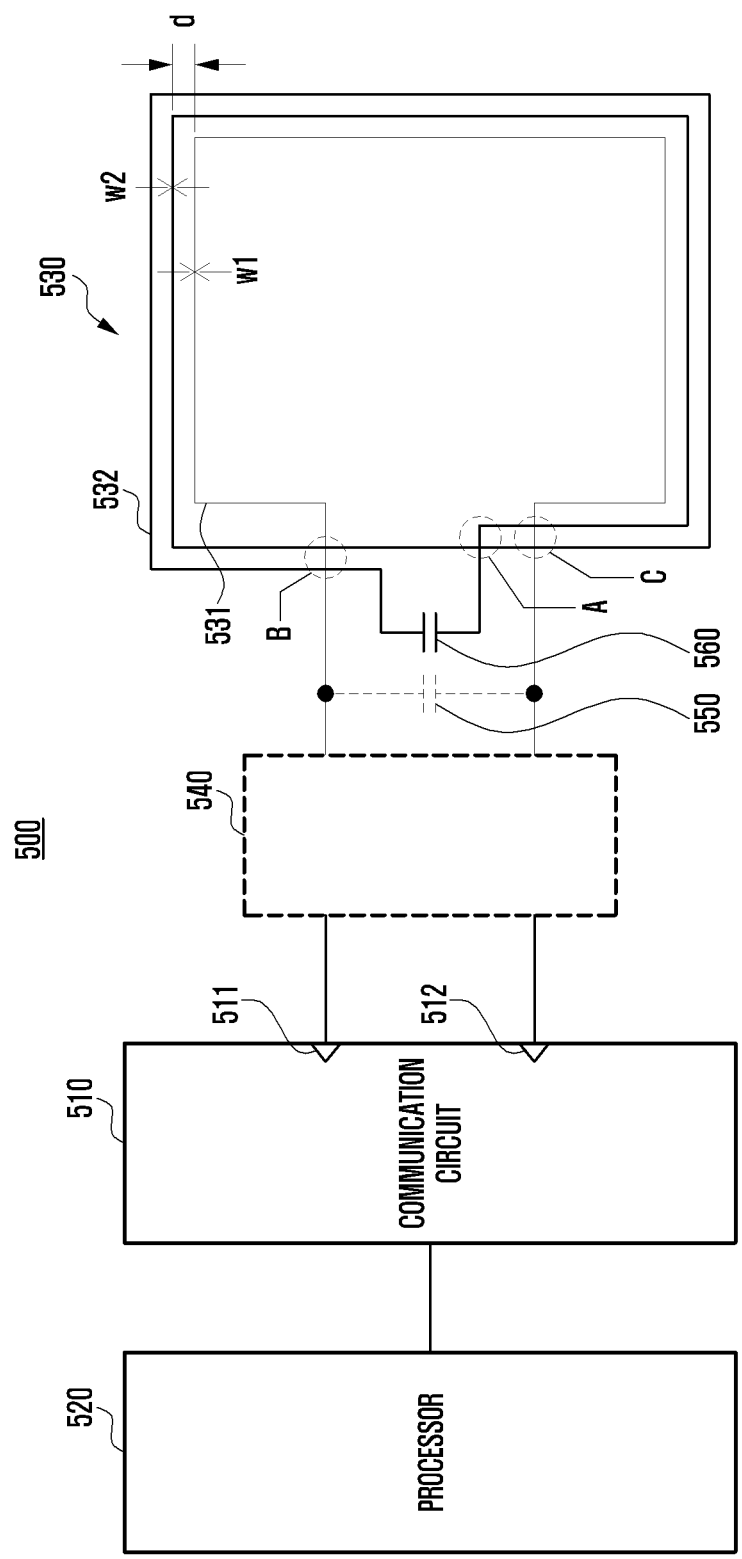

ANTENNA COIL APPARATUS AND ELECTRONIC DEVICE HAVING COIL ANTENNA

CLAIM OF PRIORITY

This application claims priority from and the benefit under 35 U.S.C. § 119(a) of Korean Patent Application No. 10-2017-0020098 filed on Feb. 14, 2017, which is hereby incorporated by reference for all purposes as if fully set forth herein.

TECHNICAL FIELD

Various embodiments of the present disclosure relate to an electronic device capable of transmitting and receiving a magnetic field signal by using a coil antenna.

BACKGROUND

An electronic device such as a smart phone may have a coil antenna for magnetic field communication such as near field communication (NFC) or magnetic secure transmission (MST). In addition, the electronic device may further have a coil antenna for charging a battery.

Specifically, the electronic device may include a communication circuit and a coil antenna electrically connected thereto. The communication circuit may output an electric signal to the coil antenna, and the coil antenna may generate a magnetic field signal using the energy of the electric signal and then emit the magnetic field signal to the exterior. In order to increase the power transmission efficiency of the magnetic field signal, the coil antenna may be designed to have low impedance. In the receive path, the coil antenna may receive a magnetic field signal, generate an electric signal using the energy of the magnetic field signal, and output the electric signal to the communication circuit. To increase the power reception efficiency of the magnetic field signal, the coil antenna may be designed with a relatively high impedance.

As described above, when the coil antenna is designed to have low impedance, the reception performance of the electronic device may deteriorate. On the contrary, when the coil antenna is designed to have high impedance, the transmission performance may deteriorate.

SUMMARY

Various embodiments of the present disclosure provide an electronic device capable of performing data communication with an external device without deteriorating the transmission and reception performance of a coil antenna. In addition, various embodiments of the present disclosure provide an electronic device that allows a portion of the coil antenna to be used for battery charging purposes.

According to various embodiments of the present disclosure, an electronic device may comprise a housing including a first surface and a second surface, facing away from the first surface; a coil antenna disposed within the housing and forming a plurality of loops around an axis substantially perpendicular to at least one of the first and second surfaces; a communication circuit disposed within the housing and configured to output an electrical signal to the coil antenna, where the coil antenna correspondingly generates a magnetic field signal; a processor disposed within the housing and electrically connected to the communication circuit. The coil antenna may include a feeding coil electrically connected to the communication circuit and forming at least one loop, and a resonance coil forming at least one loop, physically separated from the feeding coil, and located proximate to the feeding coil to enable electrical coupling with the feeding coil.

According to various embodiments of the present disclosure, an electronic device may comprise a resonance coil forming at least one loop and configured to resonate at a specific frequency; a feeding coil forming at least one loop, physically separated from the resonance coil, and located in proximity to the resonance coil so as to enable electrical coupling with the resonance coil; and a communication circuit electrically connected to the feeding coil and configured to generate an electric signal of the specific frequency.

According to various embodiments of the present disclosure, the electronic device can perform data communication with an external device without deteriorating the transmission and reception performance of the coil antenna. In addition, the electronic device can use a portion (e.g. the resonance antenna) of the coil antenna for battery charging purposes.

BRIEF DESCRIPTION OF THE DRAWINGS

FIG. 5 is a diagram illustrating an electronic device having a coil antenna according to various embodiments of the present disclosure.

DETAILED DESCRIPTION

Figure 1:
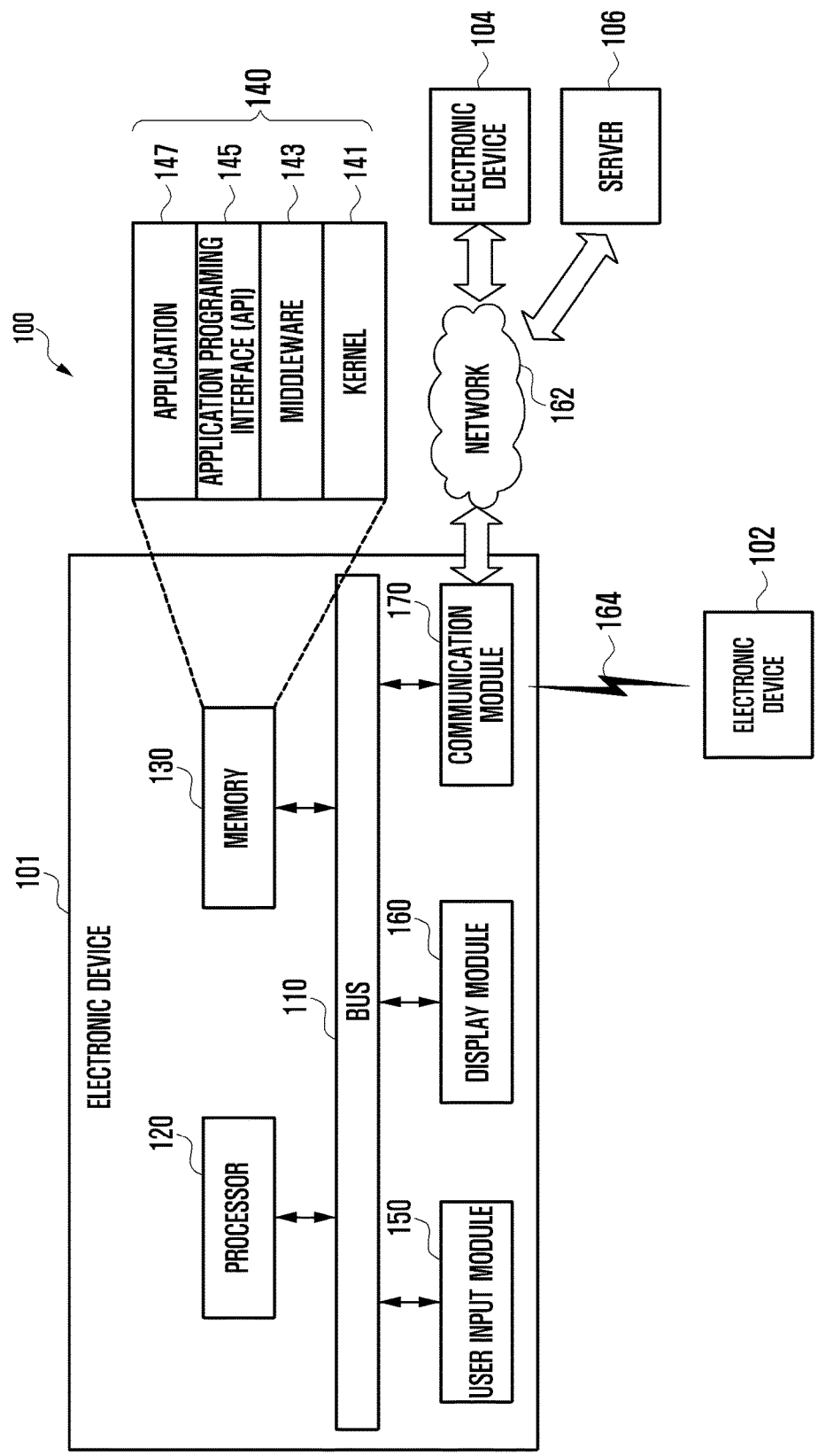
FIG. 1 is a diagram illustrating a network environment including an electronic device according to various embodiments of the present disclosure.

The following description with reference to the accompanying drawings is provided to aid in a comprehensive understanding of various example embodiments of the present disclosure as defined by the claims and their equivalents. It includes various details to assist in that understanding, but these are to be regarded as merely examples. Accordingly, those of ordinary skill in the art will recognize and understand that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various example embodiments of the present disclosure is provided for illustration purposes only and not for the purpose of limiting the present disclosure as defined by the appended claims and their equivalents.

It is to be understood that the singular forms "a," "an," and "the" include the plural form unless the context clearly dictates otherwise. Thus, for example, reference to "a component surface" includes reference to one or more of such surfaces.

The term "include" or "may include" which may be used in describing various example embodiments of the present disclosure may refer, for example, to the existence of a corresponding disclosed function, operation or component which can be used in various example embodiments of the present disclosure and does not limit one or more additional functions, operations, or components. In various example embodiments of the present disclosure, the terms such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various example embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various example embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. Similarly, without departing from the scope of the present disclosure, a first structural element may be referred to as a second structural element. The second structural element also may be referred to as the first structural element.

When it is stated that a component is "coupled to" or "connected to" another component, the component may be directly coupled or connected to another component or a further component may exist between the component and another component. On the other hand, when it is stated that a component is "directly coupled to" or "directly connected to" another component, an additional component does not exist between the component and another component.

The terms used in describing various example embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various example embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD) such as electronic glasses, electronic clothes, an electronic bracelet, an electronic necklace, an electronic accessary, an electronic tattoo, and a smart watch), or the like, but is not limited thereto.

According to some example embodiments of the present disclosure, the electronic device may be a smart home appliance having a communication function. The smart home appliance may include at least one of a television (TV), a digital versatile disc (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame, or the like, but is not limited thereto.

According to some example embodiments, the electronic device may include at least one of various types of medical devices (e.g., magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, a point of sale (POS) device of shops, and a device for Internet of things (IoT) (e.g., a fire alarm, various sensors, electric or gas meter units, a sprinkler, a thermostat, a streetlamp, a toaster, sport outfits, a hot-water tank, a heater, a boiler and the like), or the like, but is not limited thereto.

According to some example embodiments of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function, or the like, but is not limited thereto. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various example embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1 is a diagram illustrating an example network environment 100 including an electronic device 101 according to various example embodiments of the present disclosure.

Referring to FIG. 1, the electronic device 101 may include various components including a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit connecting the above described components and transmitting communication (e.g., a control message) between the above described components.

The processor 120 may include various processing circuitry and receive commands from other components (e.g., the memory 130, the input/output interface 150, the display 160, or the communication interface 170) through the bus 110, analyze the received commands, and execute calculation or data processing according to the analyzed commands.

The memory 130 stores commands or data received from the processor 120 or other components (e.g., the input/output interface 150, the display 160, or the communication interface 170) or generated by the processor 120 or other components. The memory 130 may store a software and/or a program 140. For example, the program 140 may include a kernel 141, middleware 143, an application programming interface (API) 145, and an application program (or an application) 147. At least part of the kernel 141, the middleware 143 or the API 145 may refer to an operating system (OS).

The kernel 141 controls or manages system resources (e.g., the bus 110, the processor 120, or the memory 130) used for executing an operation or function implemented by the remaining other program modules, for example, the middleware 143, the API 145, or the application 147. The kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. In operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (e.g., command) for a file control, a window control, image processing, or a character control.

The application 147 may include a short message service (SMS)/multimedia messaging service (MMS) application, an email application, a calendar application, an alarm application, a health care application (e.g., application measuring quantity of exercise or blood sugar) or an environment information application (e.g., application providing information on barometric pressure, humidity or temperature). The application 147 may be an application related to an information exchange between the electronic device 101 and an external electronic device (e.g., second external electronic device 104). The application 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., second external electronic device 104). The notification relay application may receive notification information from, for example, the second external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the second external electronic device 104, or a service (e.g., call service or message service) provided by the second external electronic device 104.

The application 147 may include an application designated according to an attribute (e.g., type of electronic device) of the second external electronic device 104. For example, when the second external electronic device 104 is a moving picture experts group (MPEG-1 or MPEG-2) audio layer-3 (MP3) player, the application 147 may include an application related to music reproduction. Similarly, when the second external electronic device 104 is a mobile medical device, the application 147 may include an application related to health care. The application 147 may include at least one of an application designated to the electronic device 101 and an application received from an external electronic device (e.g., a server 106 or the second external electronic device 104).

The input/output interface 150 may include various input/output circuitry and/or devices and transmits a command or data input from the user through an input/output device (e.g., a sensor, a keyboard, or a touch screen) to the processor 120, the memory 130, the communication interface 170, or the display 160 through, for example, the bus 110. For example, the input/output interface 150 may provide data on a user's touch input through a touch screen to the processor 120. Further, the input/output interface 150 may output a command or data received through, for example, the bus 110, from the processor 120, the memory 130, or the communication interface 170 through the input/output device (e.g., a speaker or a display). For example, the input/output interface 150 may output voice data processed through the processor 120 to the user through the speaker.

The display 160 may include, for example, liquid crystal display (LCD), flexible display, transparent display, light-emitting diode (LED) display, organic LED (OLED) display, microelectromechanical systems (MEMS) display, or electronic paper display, or the like, but is not limited thereto. The display 160 may visually offer, for example, various content (e.g., text, image, video, icon, symbol, etc.) to users. The display 160 may include a touch screen and receive, for example, a touch, gesture, proximity, or hovering input using an electronic pen or a user's body. The display 160 may be one or more displays. For example, the display 160 may be included in the electronic device 101 or included in an external device (e.g., a first external electronic device 102 or the second external electronic device 104) having a wired or wireless connection with the electronic device 101, thus outputting information offered by the electronic device 101 to users.

The display 160 may be attachable to or detachable from the electronic device 101. For example, the display 160 may include an interface which can be mechanically or physically connected to the electronic device 101. In case the display 160 is detached (e.g., separated) from the electronic device 101 by a user's selection, the display 160 may receive various control signals or image data from the processor 120, e.g., through wireless communication.

The communication interface 170 may include various communication circuitry and establish communication between the electronic device 101 and any external device (e.g., the first external electronic device 102, the second external electronic device 104, or the server 106). For example, the communication interface 170 may be connected to a network 162 through wired or wireless communication and thereby communicate with any external device (e.g., the first external electronic device 102, the second external electronic device 104, or the server 106). Additionally, the communication interface 170 may establish a short-range wireless communication with an external electronic device, such as, for example, and without limitation, external electronic devices 102, 104, or the like. The electronic device 101 may be connected to the first external electronic device 102 and the second external electronic device 104 without using the communication interface 170. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic devices 102 and 104, respectively, is attached to at least part of the electronic device 101.

Wireless communication may use, as cellular communication protocol, at least one of long-term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like. A short-range communication 163 may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a Glonass, a Beidou navigation satellite system (hereinafter, referred to as "Beidou"), and European global satellite-based navigation system (Galileo). Hereinafter, the "GPS" may be interchangeably used with the "GNSS" in the present disclosure. Wired communication may include, for example, at least one of universal serial bus (USB), high definition multimedia interface (HDMI), recommended standard-232 (RS-232), plain old telephone service (POTS), and the like. The network 162 may include telecommunication network, for example, at least one of a computer network (e.g., local area network (LAN) or wide area network (WAN)), internet, and a telephone network.

The first and second external electronic devices 102 and 104 may be identical to, or different from, the electronic device 101. The first and second external electronic devices 102 and 104 may include, for example, a plurality of electronic devices. The server 106 may include a single server or a group of servers. All or part of operations executed in the electronic device 101 may be executed in other electronic device(s), such as the first and second external electronic devices 102 and 104 or the server 106.

In case the electronic device 101 is required to perform a certain function or service automatically or by request, the electronic device 101 may request another device (e.g., the first external electronic device 102 or the second external electronic device 104 or the server 106) to execute instead, or additionally at least part, of at least one or more functions associated with the required function or service. The requested device may execute the requested function and deliver the result of execution to the electronic device 101. Then, the electronic device 101 may offer the required function or service, based on the received result or by processing the received result. For the above, cloud computing technology, distributed computing technology, or client-server computing technology may be used, for example.

Figure 2:
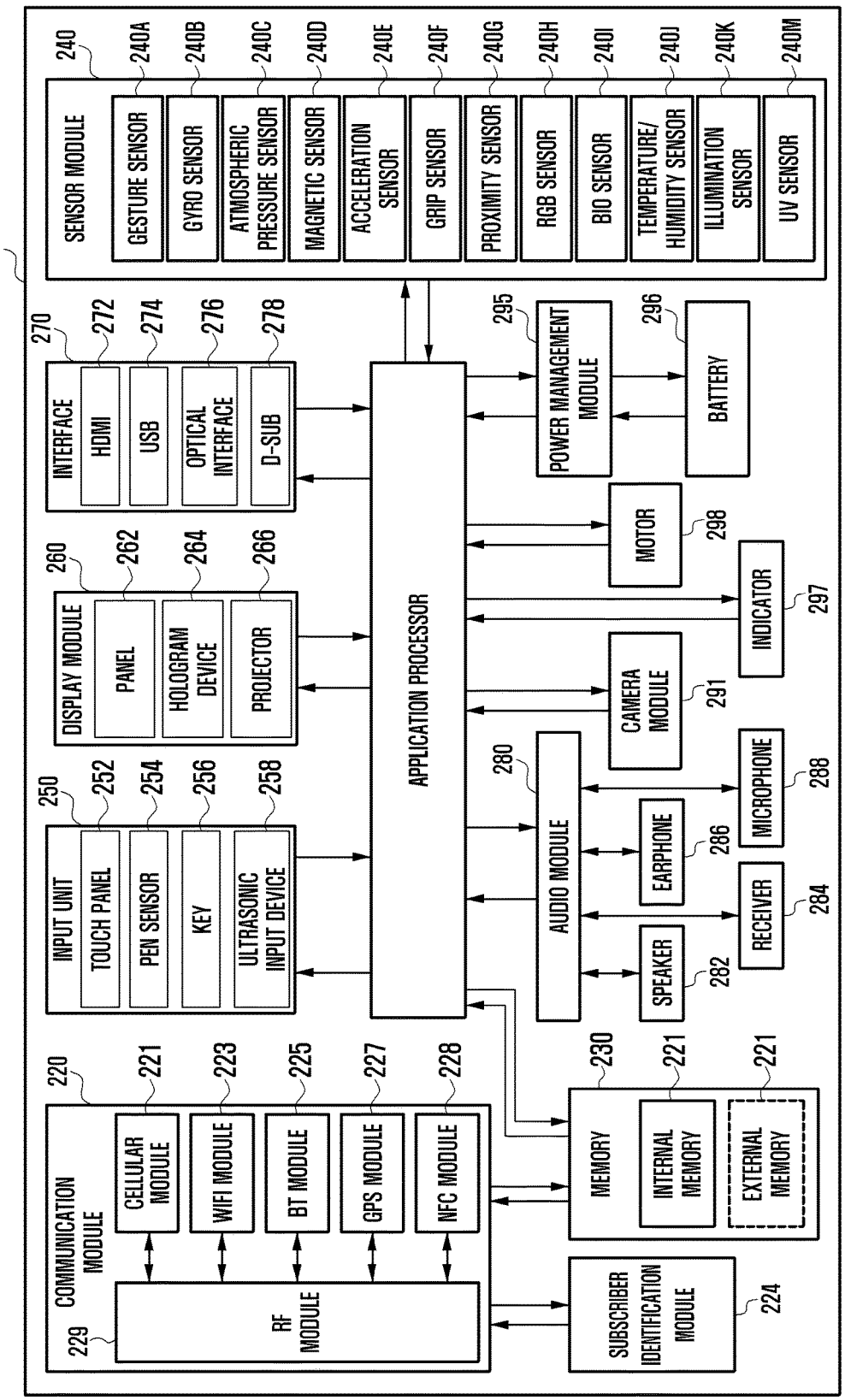
FIG. 2 is a block diagram illustrating an electronic device according to various embodiments of the present disclosure.

FIG. 2 is a block diagram illustrating an example configuration of an electronic device according to an example embodiment of the present disclosure.

Referring to FIG. 2, for example, the electronic device 201 may include part or all of the components in the electronic device 101 illustrated in FIG. 1. The electronic device 201 may include one or more processors (e.g., including processing circuitry) 210 (e.g., application processors (APs)), a communication module (e.g., including communication circuitry) 220, a subscriber identification module (SIM) 224, a memory 230, a sensor module 240, an input module (e.g., including input circuitry) 250, a display module 260, an interface (e.g., including interface circuitry) 270, an audio module 280, a camera module 291, a power management module 295, a battery 296, an indicator 297, and a motor 298.

The processor 210 may include various processing circuitry, such as, for example, and without limitation, a dedicated processor, a CPU, an application processor, an application specific integrated circuit, or the like, and is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of the components illustrated in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 220 may include various communication circuitry, such as, for example, and without limitation, the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating the electronic device 201 in a communication network by using the SIM 224 (e.g., a SIM card). The cellular module 221 may be capable of performing at least part of the functions provided by the processor 210. The cellular module 221 may also include a communication processor (CP).

Each of the Wi-Fi module 223, the BT module 225, the GNSS module 227, and the NFC module 228 may include a processor and various communication circuitry for processing data transmitted or received through the corresponding module. At least part of the cellular module 221, Wi-Fi module 223, BT module 225, GNSS module 227, and NFC module 228, (e.g., two or more modules) may be included in one integrated chip (IC) or one IC package.

The RF module 229 is capable of transmission/reception of communication signals, e.g., RF signals. The RF module 229 may include a transceiver, a power amp module (PAM), a frequency filter, a low noise amplifier (LNA), an antenna, etc. According to another embodiment of the present disclosure, at least one of the following modules cellular module 221, Wi-Fi module 223, BT module 225, GNSS module 226, NFC module 228, and MST module is capable of transmission/reception of RF signals through a separate RF module.

The SIM module 224 may include a card including a SIM and/or an embedded SIM. The SIM module 224 may also contain unique identification information, e.g., integrated circuit card identifier (ICCID), or subscriber information, e.g., international mobile subscriber identity (IMSI).

The memory 230 (e.g., memory 130 illustrated in FIG. 1) may include a built-in internal memory 232 and/or an external memory 234. The built-in internal memory 232 may include at least one of the following a volatile memory, e.g., a dynamic random access memory (DRAM), a static RAM (SRAM), a synchronous dynamic RAM (SDRAM), etc., and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro-SD, a mini-SD, an extreme digital (xD), a multi-media card (MMC), a memory stick, etc. The external memory 234 may be connected to the electronic device 201, functionally and/or physically, through various interfaces.

The memory 230 may store payment information and a payment application serving as one of the application programs. The payment information may refer to credit card numbers and personal identification numbers (PINs), corresponding to a credit card. The payment information may also include user authentication information, e.g., fingerprints, facial features, voice information, etc.

The sensor module 240 may measure/detect a physical quantity or an operation state of the electronic device 201, and convert the measured or detected information into an electrical signal. The sensor module 240 may include at least one of the following a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor may control the sensor module 240.

The input module 250 may include various input circuitry, such as, for example, and without limitation, a touch panel 252, a digital pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer to offer a tactile feedback to a user. The touch panel 252 may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include, for example, a physical button, an optical key, or a keypad. The ultrasonic input device 258 may detect ultrasonic waves occurring at an input tool through a microphone (e.g., 288) and thereby identify data corresponding to the detected ultrasonic waves.

The display 260 may include a panel 262, a hologram device 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram device 264 may show a stereoscopic image in the air by using light interference. The projector 266 may display an image by projecting light onto a screen. The screen may be located inside or outside of the electronic device 201. The display 260 may further include a control circuit for controlling the panel 262, the hologram device 264, or the projector 266.

The interface 270 may include various interface circuitry, such as, for example, and without limitation, a high-definition multimedia interface (HDMI) 272, a USB 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 may provide bidirectional conversion between a sound and an electronic signal. At least part of the components in the audio module 280 may be included in the input/output interface 150 shown in FIG. 1. The audio module 280 may process sound information input or output through a speaker 282, a receiver 284, earphones 286, microphone 288, etc.

The camera module 291 may take both still and moving images. The camera module 291 may include one or more image sensors (e.g., a front image sensor or a rear image sensor), a lens, an ISP, a flash (e.g., an LED or xenon lamp), etc.

The power management module 295 is capable of managing power of the electronic device 201. The power management module 295 may include a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge may measure the residual capacity, charge in voltage, current, or temperature of the battery 296. The battery 296 takes the form of either a rechargeable battery or a solar battery.

The indicator 297 may display a specific status of the electronic device 201 or a part thereof (e.g., the processor 210), e.g., a boot-up status, a message status, a charging status, etc. The motor 298 may convert an electrical signal into mechanical vibrations, such as, a vibration effect, a haptic effect, etc. Although not shown, the electronic device 201 may further include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
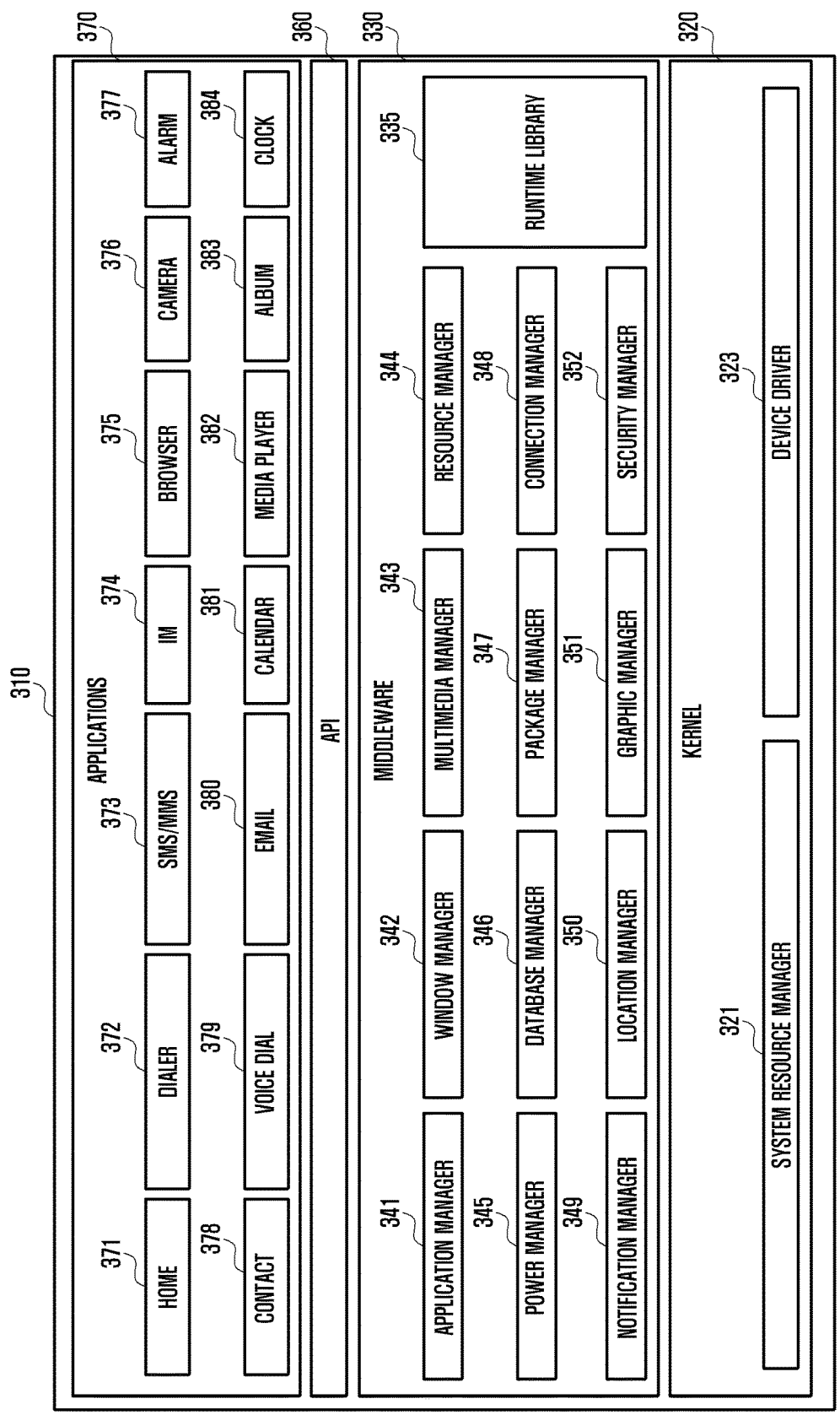
FIG. 3 is a block diagram illustrating a program module according to various embodiments of the present disclosure.

FIG. 3 is a block diagram illustrating an example program module according to an example embodiment of the present disclosure.

Referring to FIG. 3, the program module 310 (e.g., program 140 shown in FIG. 1) may include an OS for controlling resources related to the electronic device (e.g., electronic device 11) and/or various applications (e.g., application 147 shown in FIG. 1) running on the OS. The OS may be Android, iOS, Windows, Symbian, Tizen, Bada, or the like, but is not limited thereto.

The program module 310 may include a kernel 320, middleware 330, API 360 and/or applications 370. At least part of the program module 310 may be preloaded on the electronic device or downloaded from a server (e.g., the first external electronic device 102 or the second external electronic device 104, the server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a BT driver, a shared memory driver, a USB driver, a keypad driver, a Wi-Fi driver, and an audio driver. Further, the device driver 312 may include an inter-process communication (IPC) driver.

The middleware 330 may provide a function required in common by the applications 370. The middleware 330 may provide a function through the API 360 to allow the applications 370 to efficiently use limited system resources within the electronic device. The middleware 330 (for example, middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. When the electronic device (for example, the electronic device 101) has a call function, the middleware 330 may further include a telephony manager for managing a voice of the electronic device or a video call function.

The middleware 330 may include modules configuring various combinations of functions of the above described components. The middleware 330 may provide modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application 147) may include one or more applications for performing various functions, for example, and without limitation, home 371, dialer 372, SMS/MMS 373, instant message (IM) 374, browser 375, camera 376, alarm 377, contact 378, voice dial 379, email 380, calendar 381, media player 382, album 383, clock 384. Additionally, or alternatively, though not shown, the applications 370 may include various other applications, such as, for example, and without limitation, health care (e.g., an application for measuring amount of exercise, blood sugar level, etc.), and environment information (e.g., an application for providing atmospheric pressure, humidity, temperature, etc.).

The applications 370 may include an application for supporting information exchange between an electronic device (e.g., the electronic device 101) and an external device (e.g., the first and second external electronic devices 102 and 104), which is hereafter called 'information exchange application'). The information exchange application is capable of including a notification relay application for relaying specific information to external devices or a device management application for managing external devices.

For example, the notification relay application may include a function for relaying notification information, created in other applications of the electronic device (e.g., SMS/MMS application, email application, health care application, environment information application, etc.) to external devices (e.g., electronic devices 32 and 34). In addition, the notification relay application is capable of receiving notification information from external devices to provide the received information to the user.

The device management application may manage (e.g., install, remove or update) at least one function of an external device (e.g., the first and second external electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

The applications 370 may include an application (e.g., a health care application of a mobile medical device, etc.) specified attributes of an external device (e.g., the first and second external electronic devices 102 and 104). The applications 370 may include applications received from an external device (e.g., the server 106, the first and second external electronic devices 102 and 104). The applications 370 may include a preloaded application or third party applications that can be downloaded from a server. It should be understood that the components of the program module 310 may be called different names according to types of OS.

According to various example embodiments of the present disclosure, at least part of the program module 310 can be implemented with software, firmware, hardware, or any combination thereof. At least part of the program module 310 can be implemented (e.g., executed) by a processor (e.g., processor 120). At least part of the programming module 310 may include modules, programs, routines, sets of instructions or processes, etc., in order to perform one or more functions.

The term 'module' as used in various example embodiments of the present disclosure may refer, for example, to a unit including one of hardware, software, and firmware or any combination thereof. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include, for example, and without limitation, at least one of a dedicated processor, a CPU, application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments of the present disclosure can be implemented with instructions as program modules that may be stored in computer-readable storage media. One or more processors (e.g., processor 120) can execute instructions, thereby performing the functions. An example of the computer-readable storage media may be the memory 130. At least part of the program modules can be implemented (executed) by a processor. At least part of the programming module may include modules, programs, routines, sets of instructions or processes, etc., in order to perform one or more functions.

Examples of computer-readable storage media include magnetic media, such as hard disks, floppy disks, and magnetic tape, optical media such as compact disc-ROM (CD-ROM) disks and DVD, magneto-optical media, such as floptical disks, and hardware devices that are specially configured to store and perform program instructions (e.g., program modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or program modules according to various embodiments of the present disclosure may include one or more components, remove part of them described above, or include new components. The operations performed by modules, program modules, or the other components, according to various embodiments of the present disclosure, may be executed in serial, parallel, repetitive or heuristic fashion. Part of the operations can be executed in any other order, skipped, or executed with additional operations.

The various example embodiments described in the present disclosure are merely provided to assist in a comprehensive understanding of the disclosure and the technology thereof and are not suggestive of limitation. Although various example embodiments of the disclosure have been described in detail above, it should be understood that many variations and modifications of the disclosure herein described, which may be apparent to those skilled in the art, will still fall within the spirit and scope of the various example embodiments of the disclosure as defined in the appended claims.

Figure 4:
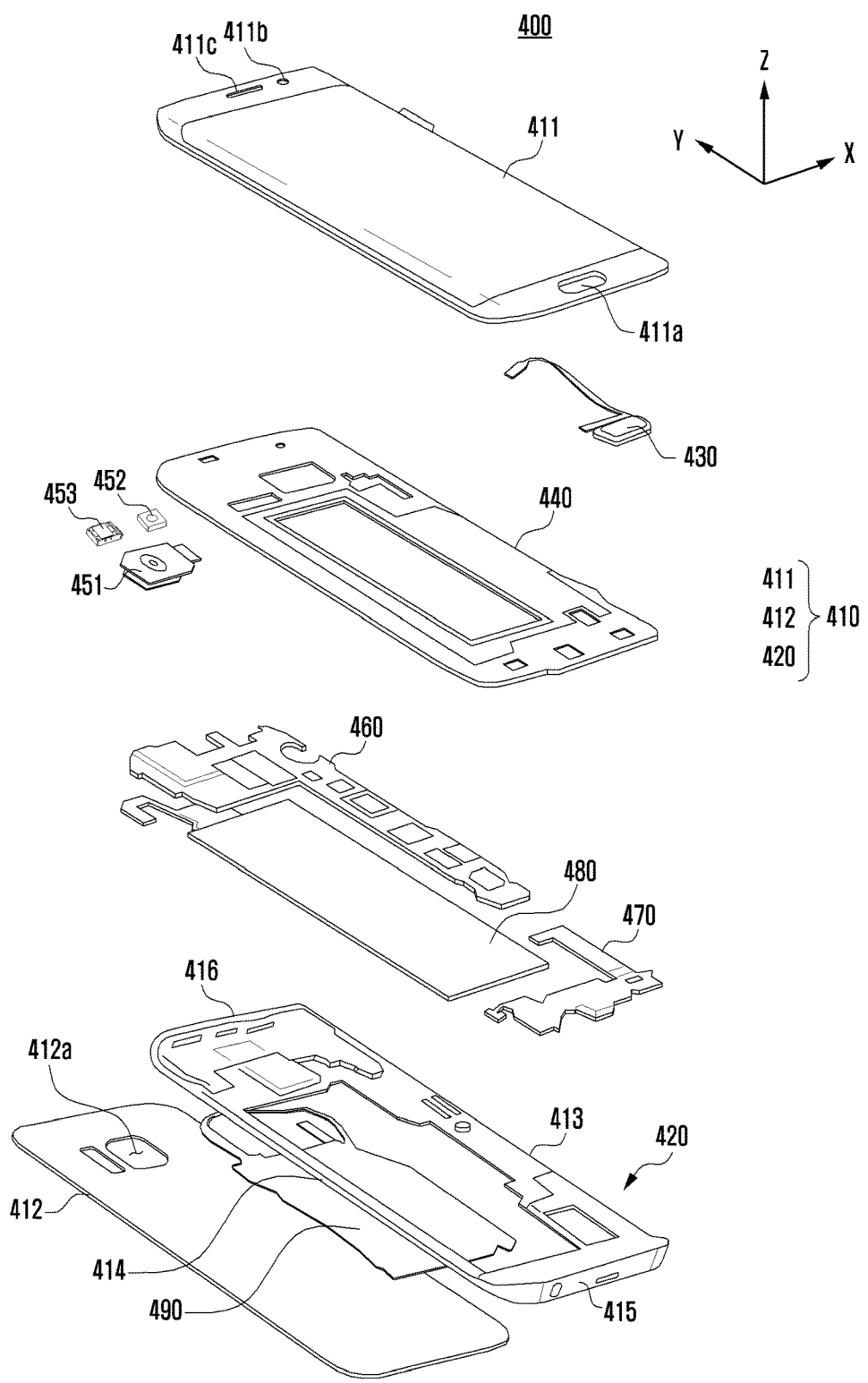
FIG. 4 is an exploded perspective view showing an electronic device according to various embodiments of the present disclosure.

FIG. 4 is an exploded perspective view showing an electronic device according to various embodiments of the present disclosure.

Referring to FIG. 4, the electronic device 400 (e.g., the electronic device 101 in FIG. 1 or the electronic device 201 in FIG. 2) may include various electronic components and a housing 410 for protecting such components.

The housing 410 may include a first surface and a second surface facing away from the first surface. According to an embodiment of the present invention, the housing 410 may include a first surface 411 facing a first direction, a second surface 412 facing a second direction which is substantially opposite to the first direction, and a side member 420 surrounding at least a portion of a space between the first surface 411 and the second surface 412.

For example, the first surface 411 may be a cover that forms a front surface of the electronic device. A display may be exposed through at least a portion of the front surface.

The second surface 412 may be a cover that forms a rear surface of the electronic device. The side member 420 may include a right side cover 413 that forms a right side surface of the electronic device, a left side cover 414 that forms a left side surface of the electronic device, a lower side cover 415 that forms a lower side surface of the electronic device, and an upper side cover 416 that forms an upper side surface of the electronic device.

Disposed inside the housing 410 may be a fingerprint sensor 430, a support frame 440 configured to support the first surface 411, a rear camera 451, a front camera 452, a receiver 453, a first substrate 460, a second substrate 470, a battery 480, and an antenna 490.

The fingerprint sensor 430 may be electrically connected to the first substrate 460 and/or the second substrate 470. In addition, the fingerprint sensor 430 may detect the contact of a fingerprint on at least a portion (e.g., a home key 411a) of the first surface 411, generate fingerprint data, and output the fingerprint data to a processor (e.g., an application processor) mounted on the first substrate 460.

The rear camera 451 may be mounted on the first substrate 460 and exposed through a hole 412a formed in the second surface 412.

The front camera 452 may be mounted on the first substrate 460 and exposed through a hole 411b formed in the first surface 411.

The receiver 453 may be mounted on the first substrate 460 and exposed through another hole 411c formed in the first surface 411. As shown, according to one embodiment, the rear camera 451 may be disposed at a lower position of the receiver 453, and the front camera 452 may be disposed at a right position of the receiver 453. According to another embodiment, the receiver 453 may be disposed at a right position of a plurality of rear cameras 451, and the front camera 452 may be disposed at a right position of the receiver 453.

The first substrate 460 may be disposed adjacent to the upper side cover 416 and electrically connected to the upper side cover 416. The second substrate 470 may be disposed adjacent to the lower side cover 415 and electrically connected to the lower side cover 415.

The antenna 490 may be electrically connected to a communication circuit (e.g., the NFC module 228 in FIG. 2) or a charging circuit (e.g., the power management module 295 in FIG. 2) mounted on the first substrate 460 or the second substrate 470.

The antenna 490 may include a coil antenna which is wound several times in a spiral form around the Z-axis. Therefore, when an electric current is supplied from the circuit mounted on the substrate to the coil antenna (i.e., power feed), a spiral current path may be formed around the Z-axis, and thus a magnetic field may be produced in the Z-axis direction perpendicular to a current direction. In other words, when a current is supplied to the coil, an electric signal of specific frequency corresponding to electrical characteristics (e.g., capacitance (C), inductance (L), and resistance (R)) of the coil may be selected (i.e., resonance). The coil may generate a magnetic field signal (i.e., a magnetic flux) by the selected electric signal and emit the magnetic field signal to the outside.

In accordance with the reciprocal principle of the antenna, the antenna 490 may receive a magnetic field signal of specific frequency, convert the magnetic field signal into an electric current, and deliver the electric signal to the circuit mounted on the substrate. Meanwhile, the coil may be included in a flexible printed circuit board (FPCB). According to one embodiment, the FPCB may be attached to the second surface 412.

FIG. 5 is a diagram illustrating an electronic device, 500, having a coil antenna according to various embodiments of the present disclosure. As shown in FIG. 5, the electronic device 500 (e.g., the electronic device 400 in FIG. 4) may include a communication circuit 510, a processor 520, and a coil antenna 530.

In communication between the electronic device 500 and any other electronic device connected via a network, the communication circuit 510 may perform data transmission/reception with the connected other electronic device through the coil antenna 530. For example, the communication circuit 510 may receive data from the processor 520 and output an electric signal of specific frequency, carrying data, to the coil antenna 530.

In the transmit path, the coil antenna 530 may generate a magnetic field signal which is induced by the electric signal received from the communication circuit 510 and emit the magnetic field signal to the exterior environment of device 500. In the receive path, the coil antenna 530 may receive a magnetic field signal of specific frequency from an outside source. The received magnetic field signal induces a current within the coil and is thereby effectively converted into an electric signal which is routed to the communication circuit 510. Then, the communication circuit 510 may obtain data from the electric signal and send the obtained data to the processor 520.

The coil antenna 530 may include a feeding coil 531 and a resonance coil 532. The resonance coil 532 may be physically separated from the feeding coil 531 and located sufficiently proximate the feeding coil 531 to enable electrical coupling with the feeding coil 531.

The feeding coil 531 may be electrically connected to the communication circuit 510. For example, a first end of the feeding coil 531 may be electrically connected to a first electrode 511 of the communication circuit 510, and a second end of the feeding coil 531 may be electrically connected to a second electrode 512 of the communication circuit 510. The feeding coil 531 may feed an electric current of specific frequency received from the communication circuit 510 to the resonance coil 532 by electrical coupling. In addition, the resonance coil 532 may receive a magnetic field signal of specific frequency. Then, the resonance coil 532 may generate an electric signal induced by the received magnetic field signal and transmit the electric signal to the communication circuit 510 through the feeding coil 531 by electrical coupling.

The number of winding turns, the length, and the cross-sectional width (W1) of the feeding coil 531 may be optimized for a specific frequency (e.g., a frequency higher than the resonance frequency). (Here, the "cross-sectional width" of a coil, also referred to herein interchangeably as just "width W1" or "width W2", may refer to a width of a conductive trace, in the case of the coil having a generally rectangular cross section. If the coil is embodied as a cylindrical wire, the cross-sectional width may refer to a diameter of the wire.) For example, FIG. 5 shows a case where resonance coil 532 has two winding turns or "loops" forming a portion of a spiral. That is, an outer loop of the resonance coil 532 may be considered to begin from a connection point at the top terminal of capacitor 560 and connect to a starting point of an inner loop of the resonance coil 532 after traversing a path of the feeding coil 531. From the starting point, the inner loop traverses a path of the feeding coil 531 and then electrically connects at an ending point thereof to the lower terminal of capacitor 560. When the resonance coil 532 has two winding turns to be optimized for the NFC frequency, the feeding coil 531 may have one winding turn such that the resonance frequency of the feeding coil 531 is higher than the NFC frequency. In addition, as an electronic component for such optimization, a capacitor 550 may be electrically connected between the ends of the feeding coil 531. Further, various electronic components (e.g., an inductor, a resistor, a transistor, etc.) may be added to the coil antenna 530 for such optimization purposes.

Additionally, an impedance matching circuit 540 may be interposed between the feeding coil 531 and the communication circuit 510 so as to reduce reflection or loss of an electric current between the feeding coil 531 and the communication circuit 510. For example, the matching circuit 540 may be a lumped element circuit which may include at least one of a resistor, an inductor, and a capacitor. In addition, the matching circuit 540 may be a distributed element which may include a strip line or microstrip element.

The resonance coil 532 and the feeding coil 531 may be formed on the same plane (e.g., the second surface 412). When viewed from above the plane, the resonance coil 532 may be disposed on the plane so as to surround a winding portion (i.e., a loop) of the feeding coil 531 while being in proximity to (adjacent to) the feeding coil 531. Here, the degree of adjacency may be defined as a distance at which a coupling effect occurs. For example, among loops of the resonance coil 532, a loop closest to the feeding coil 531 (i.e., the innermost loop of the resonance coil 532 as shown) may be separated from the loop of the feeding coil 531 by a distance 'd'. Here, the distance may be determined in consideration of the resonance frequency, the width (W1) of the feeding coil 531, and the width (W2) of the resonance coil 532. For example, the distance may be sufficiently short such that a desirable electrical coupling effect can occur. In one example, d is less than twice W1.

Overlap portions A of the resonance coil 532 may be separated from each other by, for example, a non-conductive material so as to avoid metallic contact with each other. Also, other portions B and C of the resonance coil 532 overlapping with the feeding coil 531 may be separated by a non-conductive material so as to avoid metallic contact with the feeding coil 531.

The number of winding turns, the length, and the width (W2) of the resonance coil 532 may be optimized for a resonance frequency (e.g., the NFC frequency). In addition, as an electronic component for optimization, a capacitor 560 may be electrically connected between both ends of the resonance coil 532. Because the capacitor 560 is added and thus physical dimensions (e.g., length and width) of the resonance coil 532 are compensated, an electric signal of specific frequency may be selected (i.e., resonated) by the resonance coil 532. Thus, for reception of a given signal from an external source at the specific frequency, more energy of the given signal will be captured by device 500 due to the presence of the resonance coil 532 and the capacitor 560. Likewise, when transmitting a signal from device 500 at the specific frequency, more signal energy will be emitted due to the presence of resonance coil 532 and capacitor 560. It is noted that in addition to the capacitor 560, various electronic components (e.g., an inductor, a resistor, a transistor, etc.) may be added to the coil antenna 530 for such optimization purposes.

Although the resonance coil 532 is physically separated from the feeding coil 531, the resonance coil 532 may be electrically coupled to the feeding coil 531 by a coupling effect due to the proximity of feeding coil 531. Therefore, an electric current may be induced in resonance coil 532 due to current flow within feeding coil 531. Thereby, for signal transmission from device 500 to an external device, an electric (time varying) signal at a selected frequency, which is a resonant frequency corresponding to electrical characteristics of the resonance coil 532, may be generated and emitted. The resonance coil 532 may generate a magnetic field signal induced by the electric signal and emit the magnetic field signal to the exterior. For signal or charging power reception by device 500, the resonance coil 532 may receive a magnetic field signal of specific frequency. Then, the resonance coil 532 may generate an electric signal induced by the received magnetic field signal and transfer the electric signal to the communication circuit 510 through the feeding coil 531.

Figure 6B:
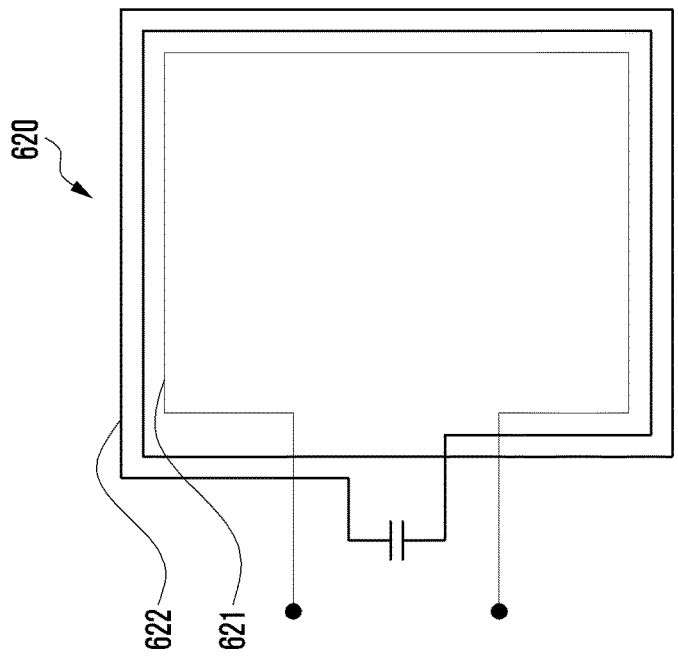
FIG. 6B illustrates an example configuration of a coil antenna according to various embodiments of the present disclosure.
Figure 6A:
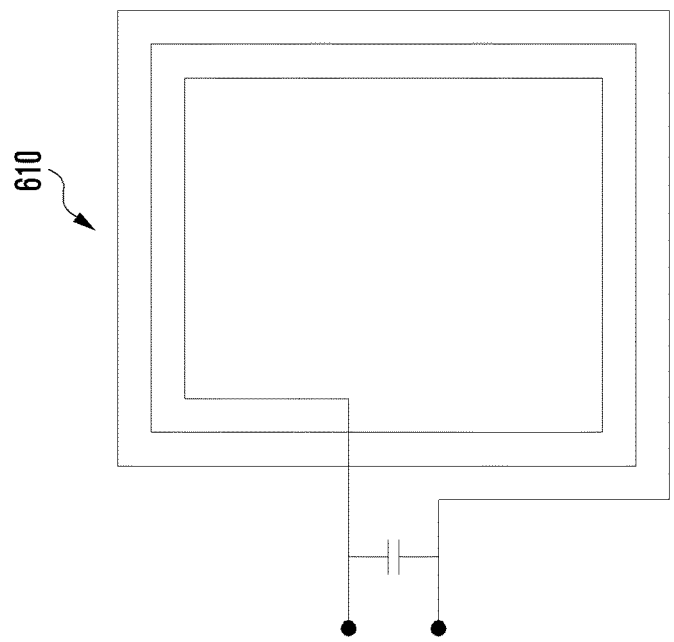
FIG. 6A illustrates a configuration of a conventional coil antenna.

FIGS. 6A and 6B illustrate configurational differences between a coil antenna 620 (FIG. 6B) according to various embodiments of the present disclosure in comparison with a conventional coil antenna 610 (FIG. 6A).

As shown in FIG. 6A, a first coil antenna 610 which is one of typical conventional coil antennas may be one coil configured to form three loops, for example. The first coil antenna 610 may emit a magnetic field signal of a specific frequency, depending on electrical characteristics (L, C) thereof.

Conversely, a second coil antenna 620 is one example of coil antennas according to the present disclosure. In view of electrical characteristics, the second coil antenna 620 may be configured to resonate at the specific frequency (its resonant frequency equals the specific frequency). Also, in view of a structure, the second coil antenna 620 differs from that of antenna 610 by including a feeding coil 621 and a resonance coil 622, which is physically separated from but electrically coupled to the feeding coil 621, rather than including one coil as in the first coil antenna 610.

The feeding coil 621 may form a single loop, and the resonance coil 622 may form two loops. In this case, the total number of winding turns in the second coil antenna 620 may be the same as in the first coil antenna 610. However, because the feeding coil 621 is physically separated from the resonance coil 622, has a length shorter than that of the first coil antenna 610, and is wound less than the first coil antenna 610, the feeding coil 621 may have lower impedance than that of the first coil antenna 610. Therefore, the feeding coil 621 may deliver power, outputted from the communication circuit, to the resonance coil 622 while consuming relatively less power than the first coil antenna 610.

The resonance coil 622 may output a relatively larger amount of power to the exterior than the first coil antenna 610. That is, when the communication circuit outputs the same power to the first coil antenna 610 and the second coil antenna 620, the power transmission efficiency of the resonance coil 622 of the second coil antenna 620 may be higher than that of the first coil antenna 610. The higher power transmission efficiency means that the communication circuit can be operated with lower power and thus the power consumption of the battery can be reduced. Further, the higher power transmission efficiency means that the electronic device using the second coil antenna 620 can perform wireless communication with other electronic devices at a relatively greater distance than the electronic device using the first coil antenna 610.

Because the impedance of the resonance coil 622 is lower than that of the first coil antenna 610, the quality factor (Q) of the resonance coil 622 may be higher than that of the first coil antenna 610. Therefore, the resonance coil 622 may receive a larger amount of power from an external source as compared with the first coil antenna 610. In other words, the power reception efficiency of the resonance coil 622 may be higher than that of the first coil antenna 610. The higher power reception efficiency means that the electronic device using the second coil antenna 620 can perform wireless communication with other electronic devices at a relatively greater distance than the electronic device using the first coil antenna 610.

FIGS. 7A to 7I are diagrams illustrating various structures of a coil antenna according to various embodiments of the present disclosure.

As discussed above, the coil antenna according to various embodiments of the present disclosure may include the feeding coil and the resonance coil separated from the feeding coil, and may have a structure as shown in FIG. 5. In other examples, the coil antenna in accordance with the present disclosure may be designed in various other structures as shown in FIGS. 7A to 7I.

Figure 7A:
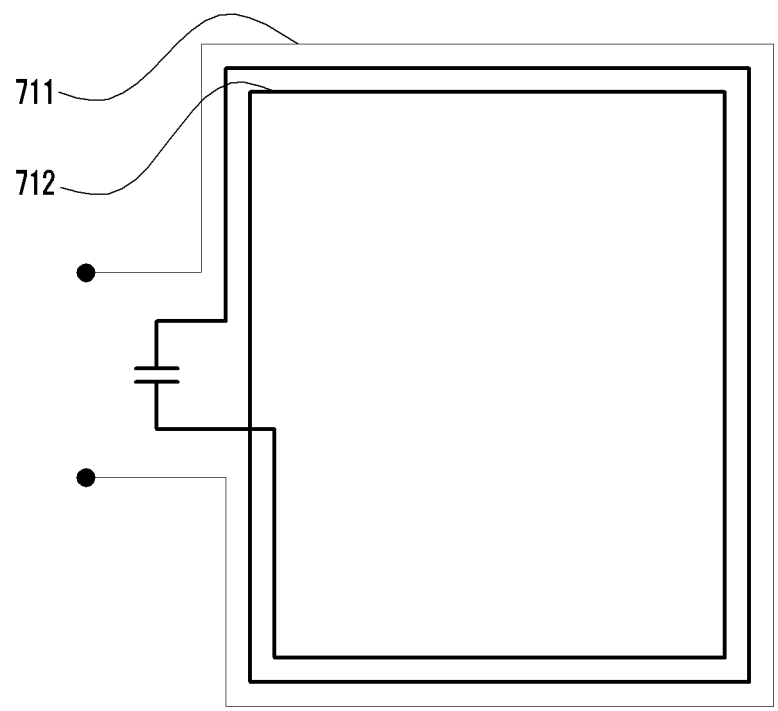
FIG. 7A, FIG. 7B, FIG. 7C, FIG. 7D, FIG. 7E, FIG. 7F, FIG. 7G, FIG. 7H and FIG. 7I are each a diagram illustrating an example structure of a coil antenna according to various embodiments of the present disclosure.

As shown in FIG. 7A, a feeding coil 711 may form a single loop, and a resonance coil 712 may form two loops. The single loop of the feeding coil 711 may be adjacent to the resonance coil 712 and also surround the resonance coil 712.

Figure 7B:
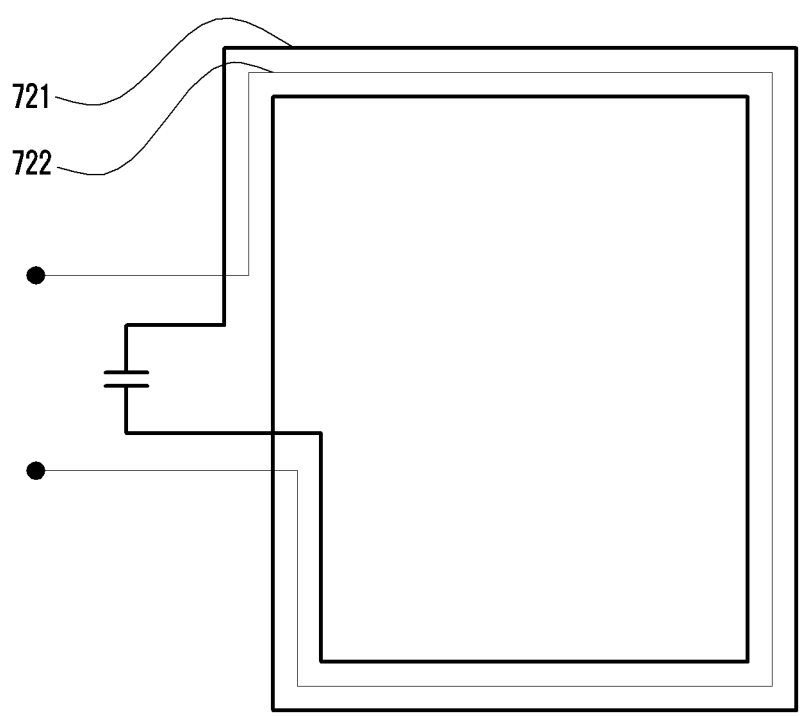

As shown in FIG. 7B, a feeding coil 722 may form a single loop, and a resonance coil 721 may form two loops. The single loop of the feeding coil 722 may be interposed between both loops of the resonance coil 721.

Figure 7C:
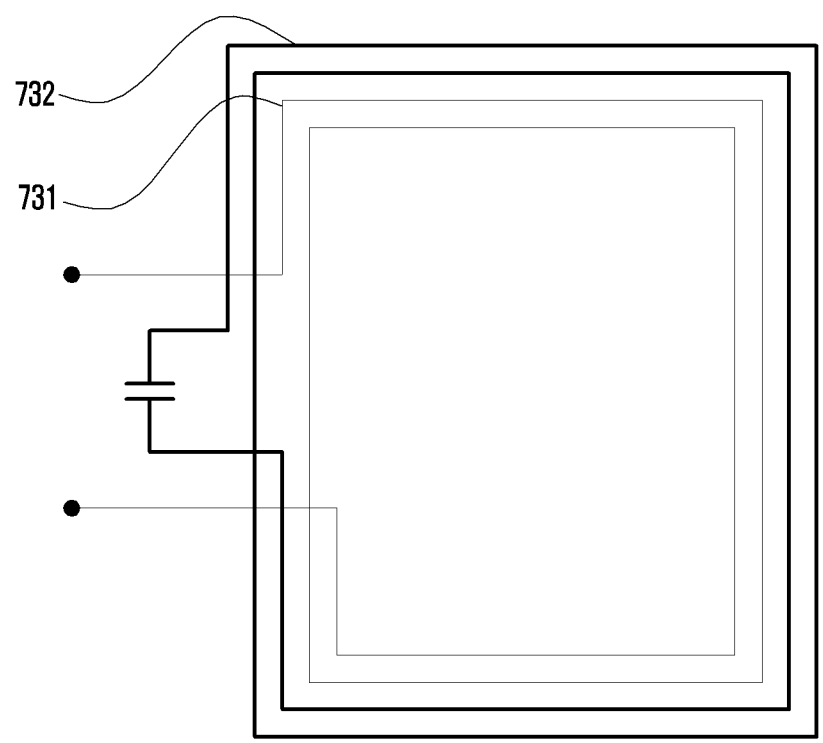

As shown in FIG. 7C, each of a feeding coil 731 and a resonance coil 732 may form two loops. The feeding coil 731 may form a plurality of loops. As the number of winding turns of the coil increases, the mutual inductance also increases. Therefore, the feeding coil 731 may have a higher inductance than that of the feeding coil 531 forming a single loop in FIG. 5. In addition, the electric power induced in the feeding coil 731 by the resonance coil 732 may also become higher than in the case of FIG. 5.

Figure 7D:
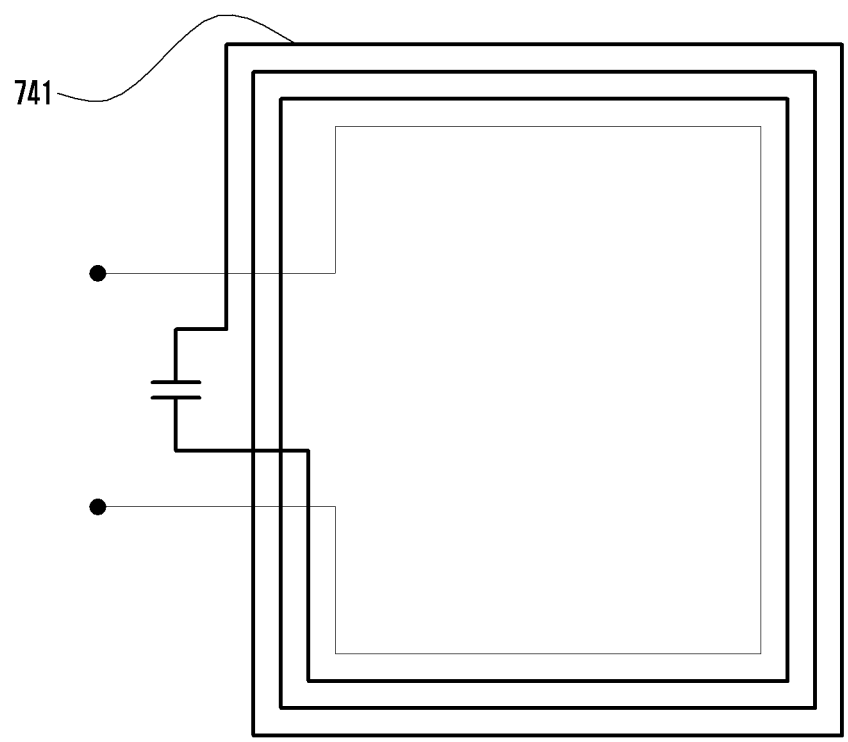

As shown in FIG. 7D, a feeding coil may form a single loop, and a resonance coil 741 may form three loops. The number of winding turns of the resonance coil 741 is greater than that of the resonance coil 532 in FIG. 5. Therefore, the electric power induced in the resonance coil 741 by a coil of an external electronic device may become higher than in the case of FIG. 5.

Figure 7E:
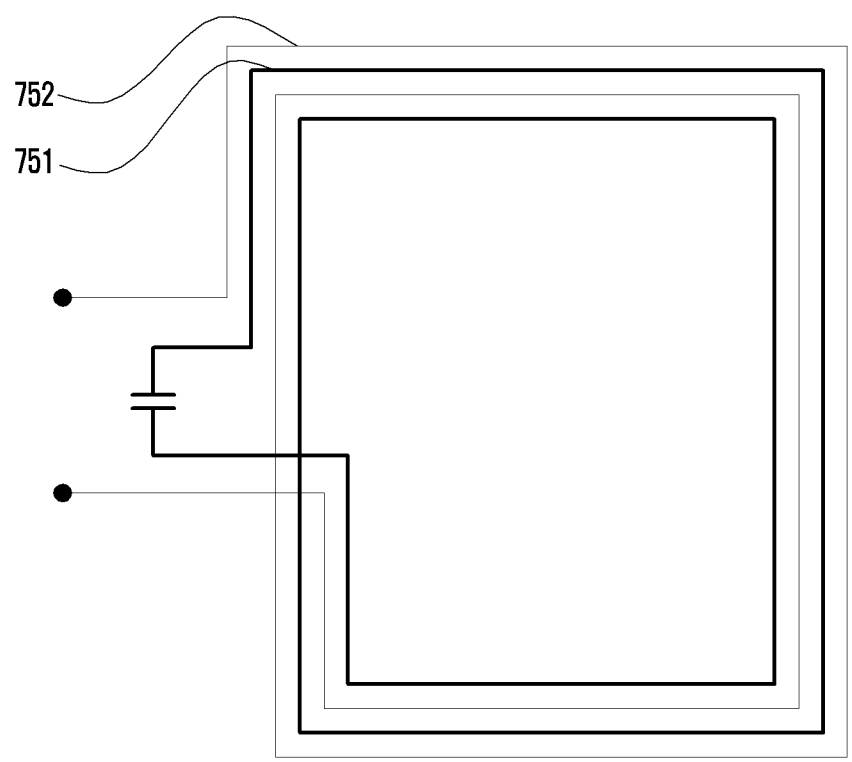

As shown in FIG. 7E, each of a resonance coil 751 and a feeding coil 752 may form multiple loops, which may be disposed alternatingly. One of the loops of the feeding coil 752 may be disposed at the outermost position of the arrangement. That is, the outermost loop of the overall antenna coil structure may be the outermost loop of the feeding coil 752.

Figure 7F:
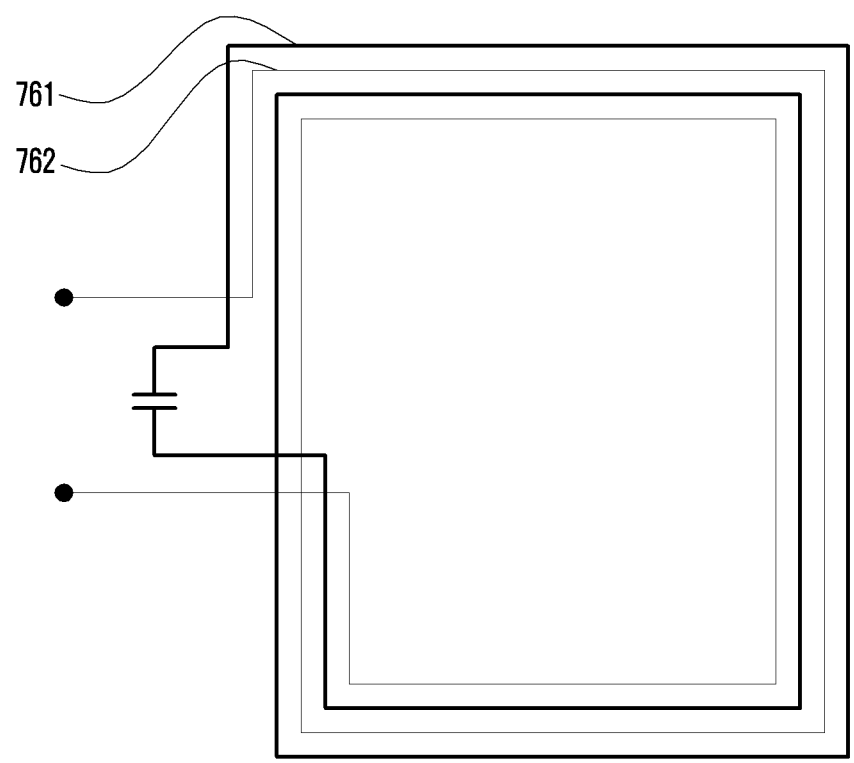

As shown in FIG. 7F, each of a resonance coil 761 and a feeding coil 762 may form multiple loops, which may be disposed alternately. One of the loops of the resonance coil 761 may be disposed at the outermost position. That is, the outermost loop of the overall antenna coil structure may be the outermost loop of the resonance coil 761.

Figure 7G:
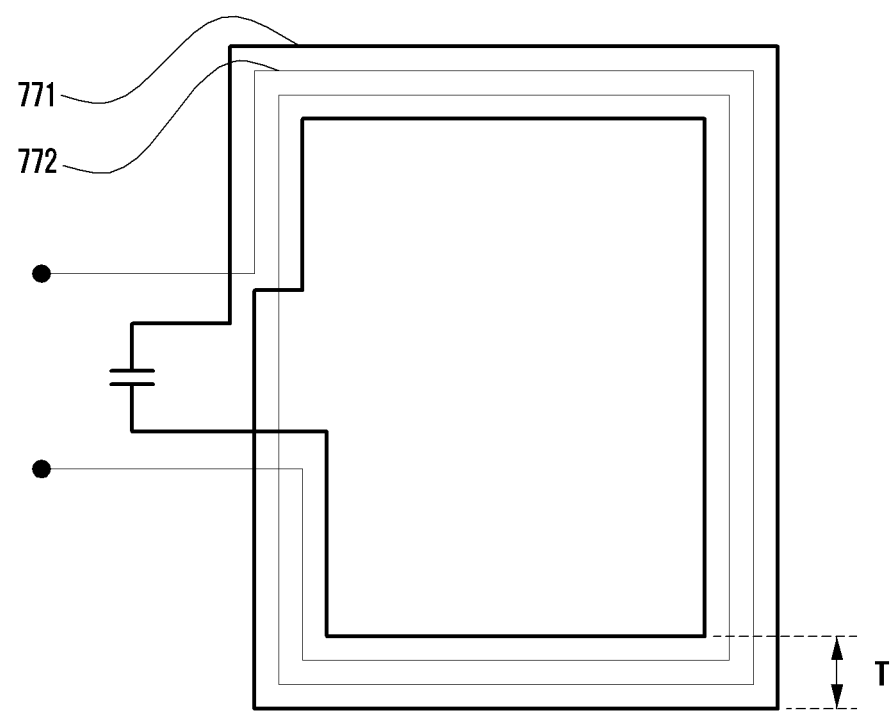

As shown in FIG. 7G, each of a resonance coil 771 and a feeding coil 772 may form multiple loops, and all the loops of the feeding coil 772 may be disposed between outer and inner loops of the resonance coil 771. In one example, the width of the resonance coil 771 may be about 0.7 mm, and the width of the feeding coil 772 may be about 0.3 mm. In addition, an interval between the resonance coil 771 and the feeding coil 772 may be about 0.2 mm, and an interval between the loops of the feeding coil 772 may be about 0.3 mm. Accordingly, the total thickness T may be about 2.7 mm (where the thickness T of the antenna coil is a closest distance between a point of the innermost loop and a point of the outermost loop on the same side of the overall coil structure). Such dimensions are merely exemplary and may be varied depending on the particular application.

Figure 7H:
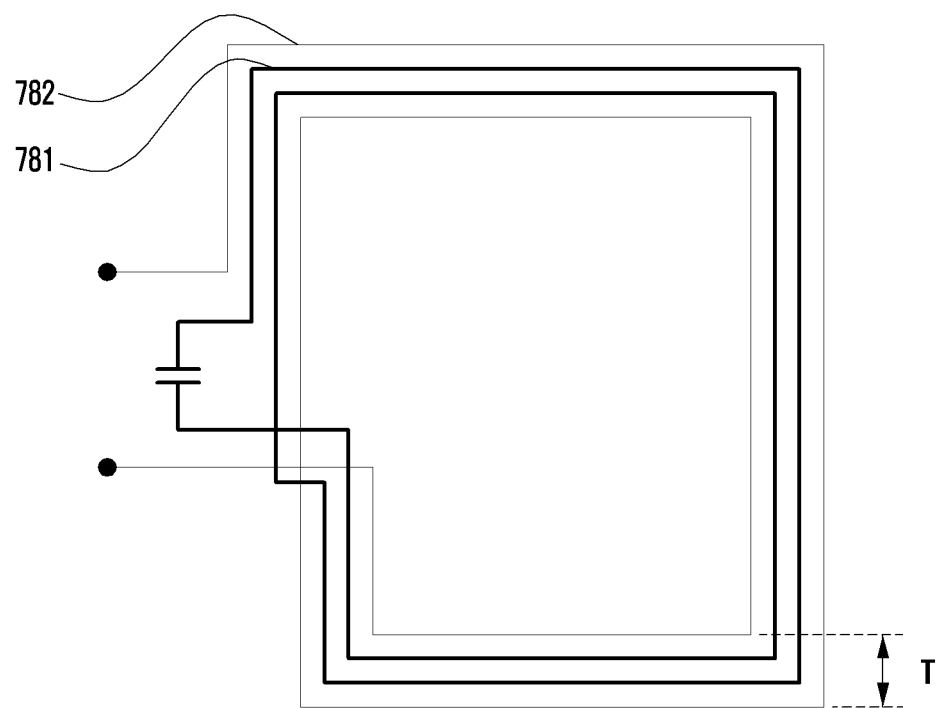

As shown in FIG. 7H, each of a resonance coil 781 and a feeding coil 782 may form multiple loops, and all the loops of the resonance coil 781 may be disposed between outer and inner loops of the feeding coil 782. In one example, the width of the resonance coil 781 may be about 0.7 mm, and the width of the feeding coil 782 may be about 0.3 mm. In addition, an interval between the resonance coil 781 and the feeding coil 782 may be about 0.2 mm, and an interval between the loops of the resonance coil 781 may be about 0.3 mm. Accordingly, the total thickness T may be about 2.7 mm. Such dimensions are merely exemplary may be varied depending on the particular application.

Figure 7I:
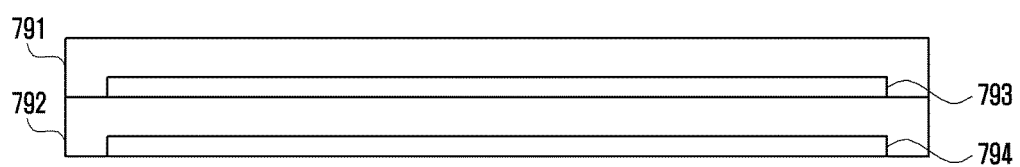

The feeding coil and the resonance coil shown in each of FIGS. 7A to 7G may be disposed on the same plane (e.g., the second surface 412). Alternatively, the feeding coil and the resonance coil may be disposed on different layers. For example, as shown in FIG. 7I, the FPCB may have a multi-layer structure in which one coil 793 (which may be either the feeding coil or the resonance coil) is located in a first layer 791 and the other coil 794 (the other one of the feeding coil and the resonance coil) is located in a second layer 792.

Figure 8:
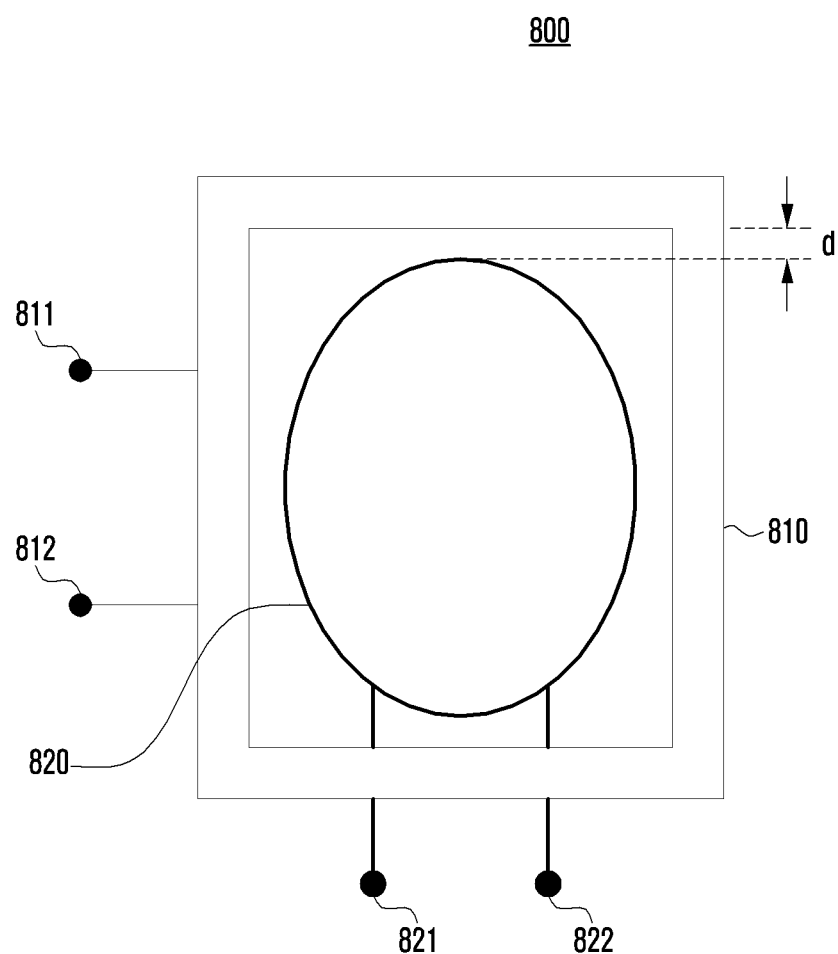
FIG. 8 is a diagram illustrating a plurality of coil antennas for communication and charging according to various embodiments of the present disclosure.

FIG. 8 is a diagram illustrating a plurality of coil antennas for communication and charging according to various embodiments of the present disclosure.

As shown in FIG. 8, the antenna 800 may include a first coil antenna 810 and a second coil antenna 820. The first coil antenna 810 may include a feeding coil and a resonance coil which is physically separated from and electrically coupled to the feeding coil. For example, the first coil antenna 810 may have a certain structure as shown in FIG. 5 or in any one of FIGS. 7A to 7I. Both ends 811 and 812 of the feeding coil of the first coil antenna 810 may be electrically connected to two electrodes of the communication circuit, respectively.

The second coil antenna 820 may be formed on the same plane (e.g., the second surface 412) as the first coil antenna 810. Alternatively, the first and second coil antennas 810 and 820 may be formed on different layers, respectively. In addition, when viewed from above the plane, the second coil antenna 820 may be located inside (within a central region of) the first coil antenna 810. The second coil antenna 820 may include a feeding coil and a resonance coil which is physically separated from the feeding coil, and may have a certain structure as shown in FIG. 5 or in any one of FIGS. 7A to 7I.

The second coil antenna 820 may be a single coil that forms multiple loops. Both ends 821 and 822 of the second coil antenna 820 may be electrically connected to two electrodes of the charging circuit (e.g., the power management module 295), respectively. Therefore, the second coil antenna 820 may be used as an antenna for charging the battery.

The second coil antenna 820 may be separated from the first coil antenna 810 by a distance 'd'. Here, this distance 'd' is for preventing interference between the first and second coil antennas 810 and 820, and may be determined depending on the width of a coil of the second coil antenna 820. For example, the distance 'd' may be determined to be at least twice the above width.

On the other hand, the resonance coil may be used for both communication and charging. Thus, using one coil antenna, both communication and charging are possible.

Figure 9:
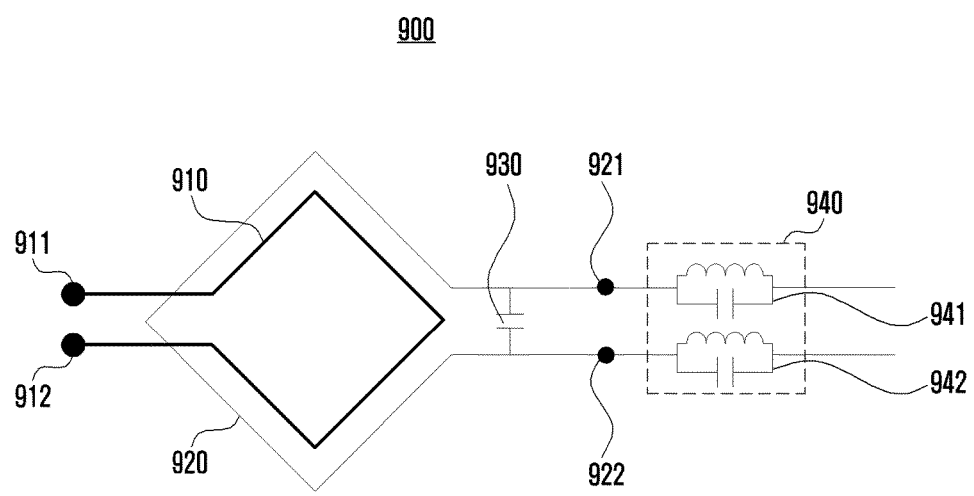
FIG. 9 is a diagram illustrating a coil antenna used for both communication and charging according to one embodiment of the present disclosure.

FIG. 9 is a diagram illustrating a coil antenna, 900, used for both communication and charging according to one embodiment of the present disclosure.

As shown in FIG. 9, the coil antenna 900 may include a feeding coil 910 and a resonance coil 920 which is physically separated from and electrically coupled to the feeding coil 910.

The resonance coil 920 may form a single loop or multiple loops. First and second ends 921 and 922 of the resonance coil 920 may be electrically connected to the charging circuit.

The resonance coil 920 may be designed to resonate at a first specific frequency and also resonate at a second specific frequency. For example, the first specific frequency may be a wireless charging frequency (e.g., 10 MHz or less), and the second specific frequency may be an NFC frequency (i.e., 13.56 MHz). In order to design the resonance coil 920 to be optimized for the specific frequencies, a resonance capacitor 930 may be electrically connected between both ends 921 and 922 of the resonance coil 920.

In addition, a filter 940 may be electrically connected to the resonance coil 920. The filter 940 may be designed to have a low impedance for an electric signal of the first specific frequency and to have a relatively high impedance for an electric signal of the second specific frequency.

The filter 940 which is, for example, a notch filter may include a first LC parallel circuit 941 for electrically connecting the first end 921 to the charging circuit, and a second LC parallel circuit 942 for electrically connecting the second end 922 to the charging circuit. Here, L and C may be determined as values for blocking an electric signal of the second specific frequency and for passing the other frequency components. Therefore, the resonance coil 920 may receive a magnetic field signal of the first specific frequency. Then, the resonance coil 920 may generate an electric signal by the received magnetic field signal and transmit the generated electric signal to the charging circuit through the filter 940. The electric signal of the second specific frequency may be blocked by the filter 940 so as to prevent its transmission to the charging circuit.

The feeding coil 910 may form a single loop or multiple loops. First and second ends 911 and 912 of the feeding coil 910 may be electrically connected to the communication circuit. The feeding coil 910 may be designed to be physically separated from and electrically coupled to the resonance coil 920. Specifically, the design and disposition of the feeding coil 910 and the resonance coil 920 may be realized as described above with reference to FIGS. 5 to 7 so as to enable the communication circuit to perform data transmission and reception through the resonance coil 920.

When wireless charging is performed through the resonance coil 920, an electric signal of the first specific frequency or harmonic components thereof may be transmitted to the feeding coil 910. Because the feeding coil 910 is physically separated from the resonance coil 920, a power loss may occur when the electric signal of the first specific frequency or harmonic components thereof are transmitted to the feeding coil 910. Therefore, the risk of damage to the communication circuit is low. In order to further reduce this risk, the feeding coils 910 may be designed to resonate at a certain frequency (e.g., 20 MHz or more) higher than the second specific frequency.

Figure 10:
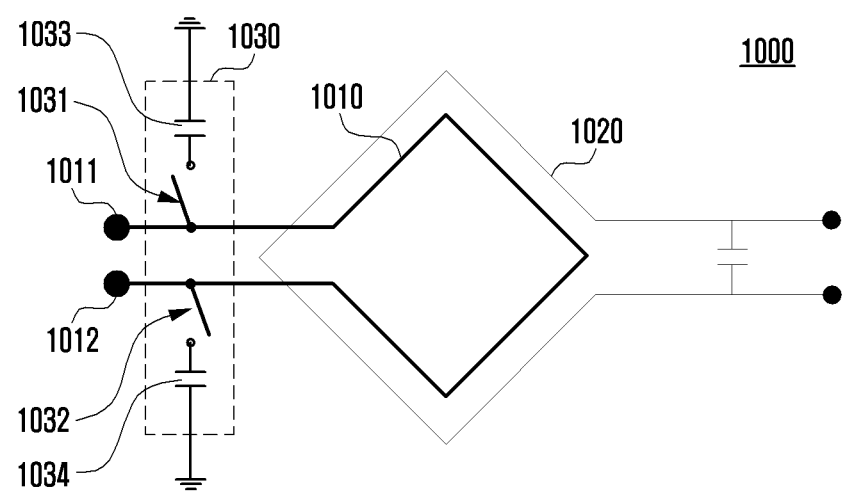
FIG. 10 is a diagram illustrating a coil antenna used for both communication and charging according to another embodiment of the present disclosure.

FIG. 10 is a diagram illustrating a coil antenna used for both communication and charging according to another embodiment of the present disclosure.

As shown in FIG. 10, the coil antenna 1000 may include a feeding coil 1010 electrically connected to the communication circuit, and a resonance coil 1020 electrically connected to the charging circuit.

The resonance coil 1020 may be designed to resonate at a wireless charging frequency and also resonate at a second specific frequency (e.g., an NFC frequency). In addition, the resonance coil 1020 may be electrically coupled to and physically separated from the feeding coil 1010. Therefore, as described above with reference to FIG. 9, the risk of damage to the communication circuit electrically connected to the feeding coil 1010 is low. Further, in this embodiment, a damage prevention circuit 1030 may be electrically connected to the feeding coil 1010.

The damage prevention circuit 1030 may include a first switch 1031 electrically connected to a first end 1011 of the feeding coil 1010, a first capacitor 1031 (also referred to as a de-tuning capacitor) disposed between the first switch 1031 and the ground, a second switch 1032 electrically connected to a second end 1012 of the feeding coil 1010, and a second capacitor 1034 disposed between the second switch 1032 and the ground.

In case of a data transmission/reception mode through the resonance coil 1020, the first and second switches 1031 and 1032 may be turned off. Thus, the electrical connection between the feeding coil 1010 and each of the capacitors 1033 and 1034 may be cut off. In case of a battery charging mode through the resonance coil 1020, the first and second switches 1031 and 1032 may be turned on so that the first and second capacitors 1033 and 1034 may be electrically connected to the feeding coil 1010. Thus, an electric signal (i.e., a time varying signal) of the first specific frequency or harmonic components thereof may be prevented from being transmitted to the communication circuit. The on/off of the switches 1031 and 1032 may be controlled by the communication circuit or the processor.

According to embodiments of the present disclosure, an electronic device may comprise a housing including a first surface and a second surface, facing away from the first surface; a coil antenna disposed within the housing and forming a plurality of loops around an axis substantially perpendicular to at least one of the first and second surfaces; a communication circuit disposed within the housing and configured to output an electrical signal to the coil antenna, where the coil antenna correspondingly generates a magnetic field signal; a processor disposed within the housing and electrically connected to the communication circuit. The coil antenna may include a feeding coil electrically connected to the communication circuit and forming at least one loop, and a resonance coil forming at least one loop, physically separated from the feeding coil, and located proximate to the feeding coil to enable electrical coupling with the feeding coil.

The electronic device may further comprise a battery; and a charging circuit disposed within the housing, electrically connected to the resonance coil, and configured to charge the battery by using a charging signal received through the resonance coil.

The feeding coil may be configured to resonate at a frequency higher than a resonance frequency of the resonance coil.

The electronic device may further comprise a filter interposed between the resonance coil and the charging circuit and configured to pass a time varying signal of a first specific frequency and to prevent a time varying signal of a second specific frequency from flowing to the charging circuit.

The first specific frequency may be a wireless charging frequency, and the second specific frequency may be an NFC frequency.

The electronic device may further comprise a damage prevention circuit configured to prevent damage to the communication circuit by the charging signal received at the feeding coil through the resonance coil.

The damage prevention circuit may include a first switch electrically connected to a first end of the feeding coil, a first capacitor disposed between the first switch and a ground, a second switch electrically connected to a second end of the feeding coil, and a second capacitor disposed between the second switch and the ground.

When the battery is charged using the electric signal received through the resonance coil, the first and second switches may be turned on so that the first and second capacitors are electrically connected to the feeding coil.

The on/off of the first and second switches may be controlled by the communication circuit or the processor.

The electronic device may further comprise a second coil antenna disposed inside the first coil antenna when viewed from above the second surface; and a charging circuit electrically connected to the second coil antenna and configured to charge a battery by using an electric signal received through the second coil antenna.

The feeding coil and the resonance coil may be formed on the second surface.

The feeding coil and the resonance coil may be formed on different layers.

One of the feeding coil and the resonance coil may surround the other.

The number of winding turns of the feeding coil may be greater than the number of winding turns of the resonance coil.

The at least one loop of the feeding coil and the at least one loop of the resonance coil may be disposed alternately.

According to embodiments of the present disclosure, an electronic device may comprise a resonance coil forming at least one loop and configured to resonate at a specific frequency; a feeding coil forming at least one loop, physically separated from the resonance coil, and located proximate to the resonance coil so as to enable electrical coupling with the resonance coil; and a communication circuit electrically connected to the feeding coil and configured to generate an electric signal of the specific frequency.

The electronic device may further comprise a battery; and a charging circuit electrically connected to the resonance coil and configured to charge the battery by using an electric signal received through the resonance coil.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An electronic device comprising:
   a coil antenna forming a plurality of loops;
   a communication circuit configured to output an electrical signal to the coil antenna, wherein the coil antenna correspondingly generates an electromagnetic field signal;
   a processor electrically connected to the communication circuit,
   wherein the coil antenna includes:
      a feeding coil electrically connected to the communication circuit and forming at least one loop and configured to receive the electrical signal from the communication circuit; and
      a resonance coil forming at least one loop, physically separated from the feeding coil, and located proximate the feeding coil to enable electrical coupling therewith, wherein the electrical signal received by the feeding coil causes the resonance coil to generate the electromagnetic field signal.

2. The electronic device of claim 1, further comprising:
   a battery; and
   a charging circuit electrically connected to the resonance coil, and configured to charge the battery by using a charging signal received through the resonance coil.

3. The electronic device of claim 1, wherein the feeding coil is configured to resonate at a frequency higher than a resonance frequency of the resonance coil.

4. An electronic device comprising:
   a coil antenna forming a plurality of loops;
   a communication circuit configured to output an electrical signal to the coil antenna, wherein the coil antenna correspondingly generates an electromagnetic field signal;
   a processor electrically connected to the communication circuit,
   wherein the coil antenna includes:
      a feeding coil electrically connected to the communication circuit and forming at least one loop, and
      a resonance coil forming at least one loop, physically separated from the feeding coil, and located proximate the feeding coil to enable electrical coupling therewith;
   a battery;
   a charging circuit, electrically connected to the resonance coil, and configured to charge the battery by using a charging signal received through the resonance coil; and
   a filter interposed between the resonance coil and the charging circuit and configured to pass an electrical signal of a first specific frequency and to prevent an electrical signal of a second specific frequency from flowing to the charging circuit.

5. The electronic device of claim 4, wherein the first specific frequency is a wireless charging frequency, and the second specific frequency is an NFC frequency.

6. The electronic device of claim 2, further comprising:
   a damage prevention circuit configured to prevent damage to the communication circuit by the charging signal received through the resonance coil.

7. The electronic device of claim 6, wherein the damage prevention circuit includes:
   a first switch electrically connected to a first end of the feeding coil,
   a first capacitor disposed between the first switch and a ground,
   a second switch electrically connected to a second end of the feeding coil, and
   a second capacitor disposed between the second switch and the ground.

8. The electronic device of claim 7, wherein when the battery is charged using a receive path signal received through the resonance coil, the first and second switches are turned on so that the first and second capacitors are electrically connected to the feeding coil.

9. The electronic device of claim 8, wherein on/off of the first and second switches is controlled by the communication circuit or the processor.

10. The electronic device of claim 1, further comprising a housing including a first surface and a second surface facing away from the first surface,
wherein the coil antenna is a first coil antenna, and the electronic device further comprising:
a second coil antenna disposed within a central region of the first coil antenna as viewed from above the second surface; and
a charging circuit electrically connected to the second coil antenna and configured to charge a battery by using an electric signal received through the second coil antenna.

11. The electronic device of claim 1, further comprising a housing including a first surface and a second surface facing away from the first surface, wherein the feeding coil and the resonance coil are formed on the second surface.

12. The electronic device of claim 1, wherein the feeding coil and the resonance coil are formed on different layers.

13. The electronic device of claim 1, wherein one of the feeding coil and the resonance coil substantially surrounds the other.

14. The electronic device of claim 13, wherein the number of winding turns of the feeding coil is greater than the number of winding turns of the resonance coil.

15. The electronic device of claim 1, wherein the at least one loop of the feeding coil and the at least one loop of the resonance coil are disposed alternately.

16. An electronic device comprising:
a resonance coil forming at least one loop and configured to resonate at a specific frequency;
a feeding coil forming at least one loop, physically separated from the resonance coil, and located in proximity to the resonance coil to enable electrical coupling with the resonance coil; and
a communication circuit electrically connected to the feeding coil and configured to provide an electric signal of the specific frequency to the feeding coil,
wherein the resonance coil is configured to generate an electromagnetic field corresponding to the electric signal provided by the communication circuit to the feeding coil.

17. The electronic device of claim 16, further comprising:
a battery; and
a charging circuit electrically connected to the resonance coil and configured to charge the battery by using a charging signal received through the resonance coil.

* * * * *

UNITED STATES PATENT AND TRADEMARK OFFICE
CERTIFICATE OF CORRECTION

PATENT NO. : 10,454,171 B2
APPLICATION NO. : 15/895246
DATED : October 22, 2019
INVENTOR(S) : Sehwan Choi et al.

Page 1 of 1

It is certified that error appears in the above-identified patent and that said Letters Patent is hereby corrected as shown below:

On the Title Page

Item (30) should read as follows:
--...Feb. 14, 2017 (KR) .................. 10-2017-0020098...--

Signed and Sealed this
Nineteenth Day of November, 2019

Andrei Iancu
*Director of the United States Patent and Trademark Office*